Patented Feb. 6, 1945

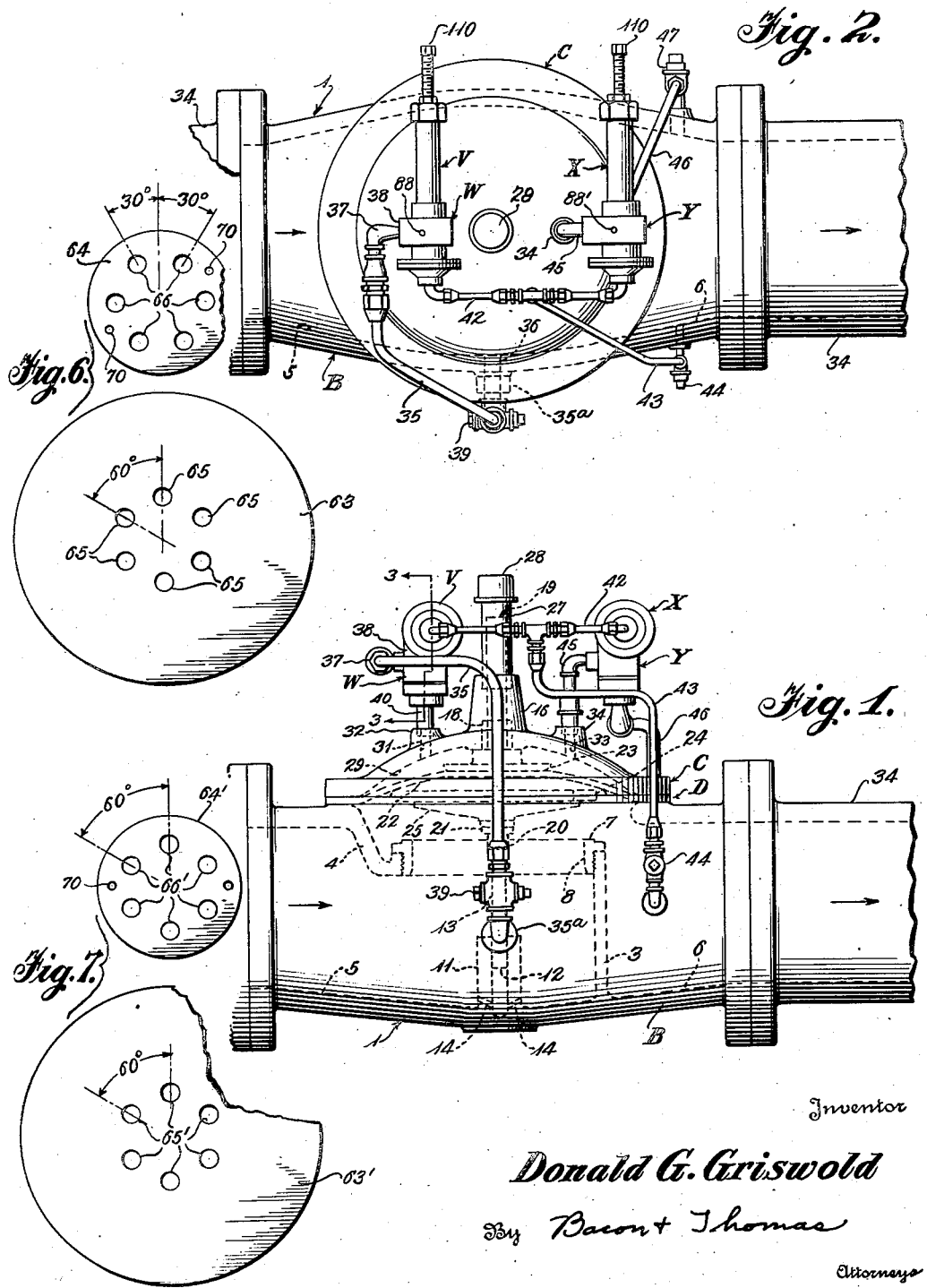

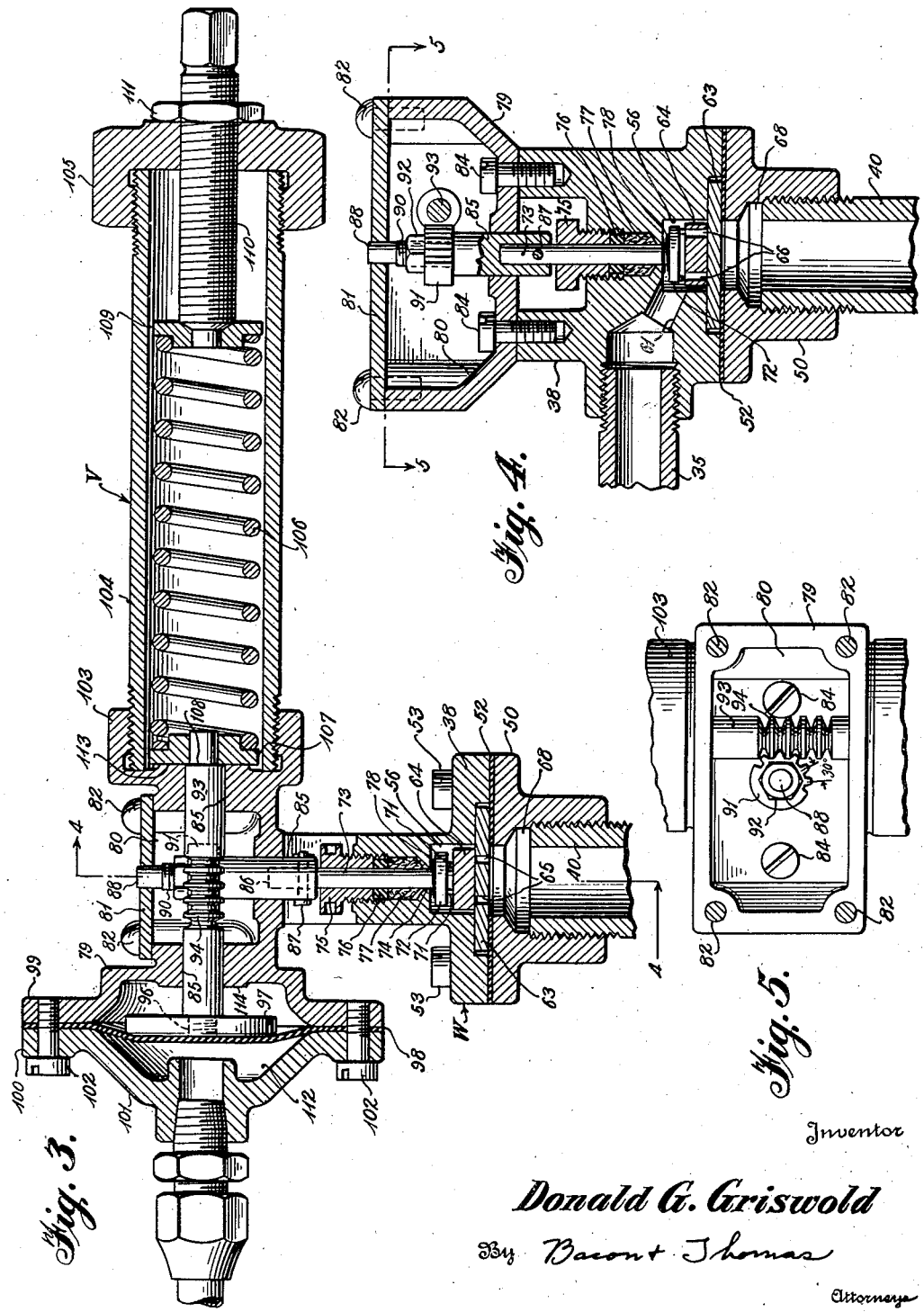

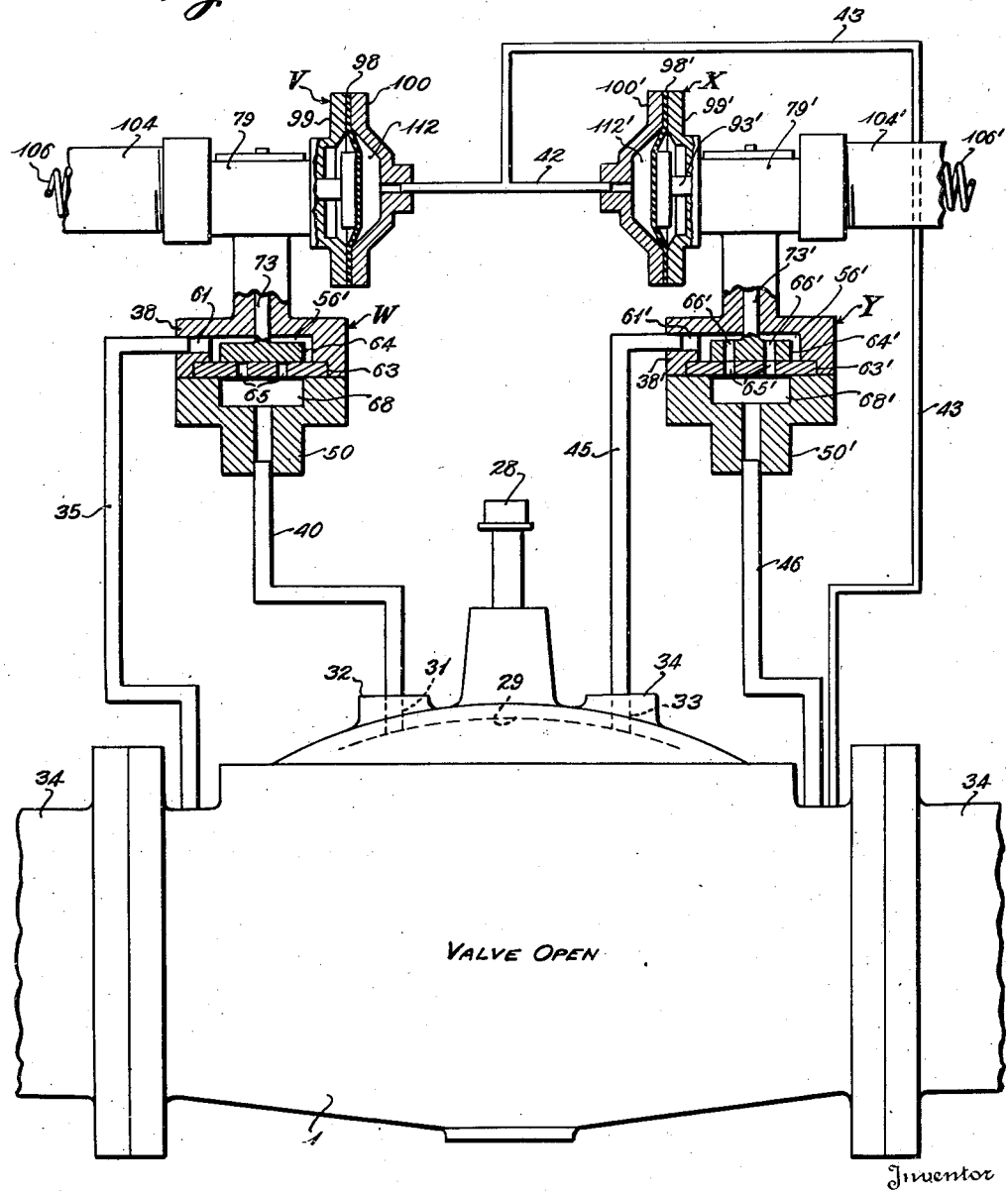

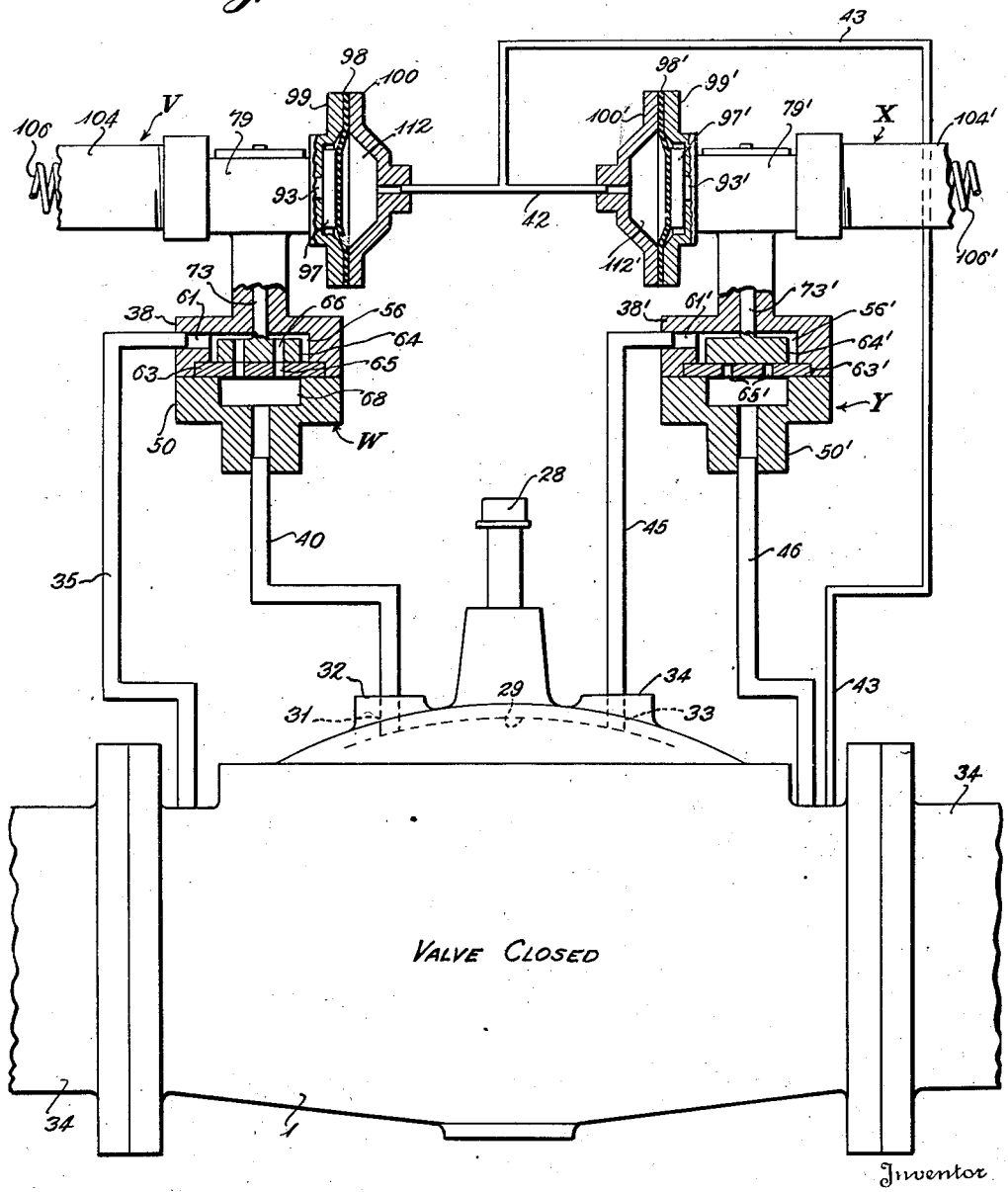

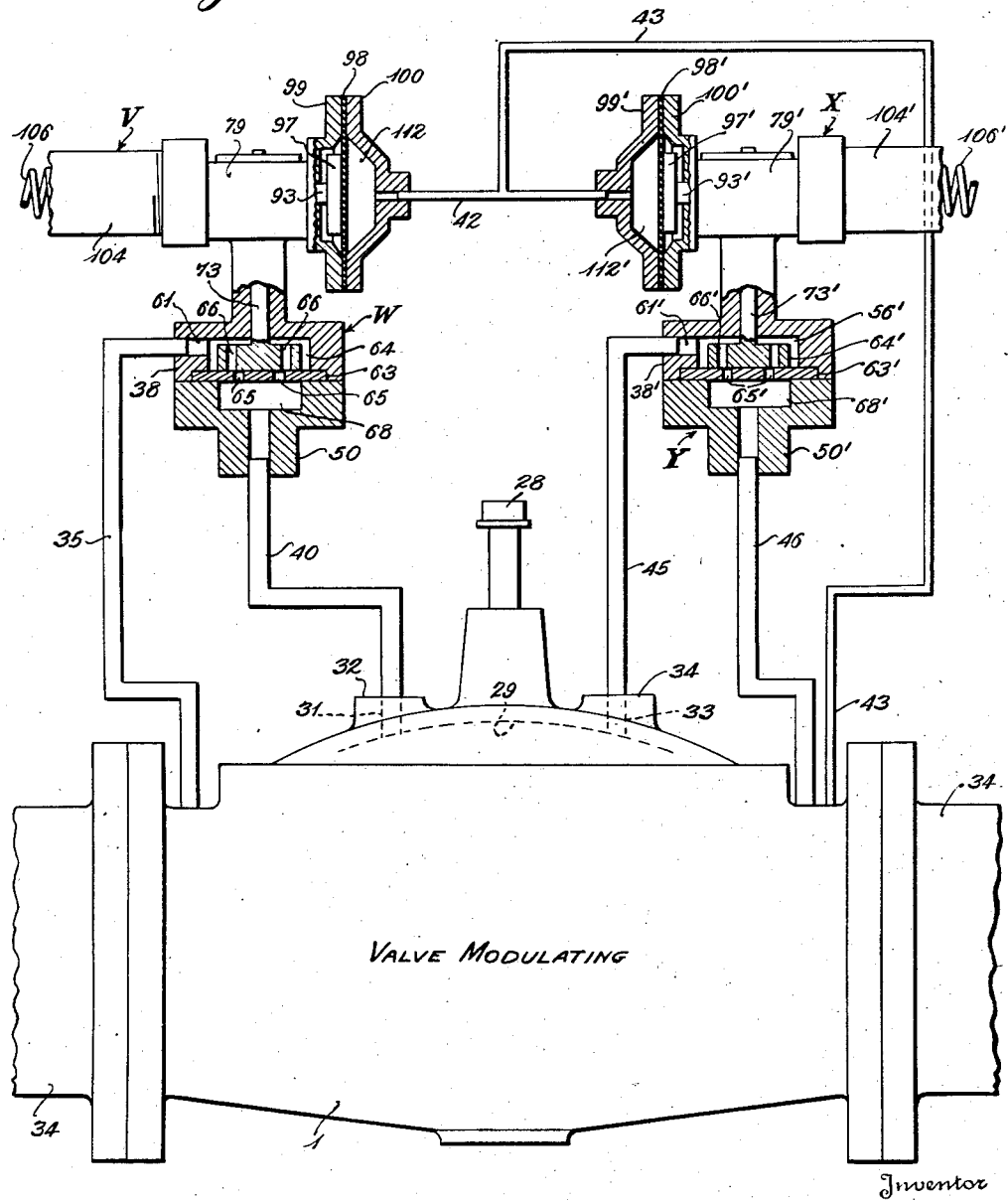

2,368,981

UNITED STATES PATENT OFFICE 2,368,981

PRESSURE REDUCING VALVE WITH DUAL PILOT VALVE CONTROL

Donald G. Griswold, Alhambra, Calif., assignor to Clayton Manufacturing Company, Alhambra, Calif.

Application July 18, 1942, Serial No. 451,502

2 Claims. (Cl. 50—10)

This invention relates to valves and more particularly to water pressure reducing valves provided with automatic control means for maintaining a substantially constant pressure on the downstream side of the valve, irrespective of pressure variations on the upstream side of said valve.

One of the principal objects of the invention is to provide a pressure reducing valve which not only eliminates water hammer and shock due to the pressure on the upstream side of the valve, but which will maintain a given reduced pressure on the downstream side of the valve with a minimum of fluctuation.

Another object of the invention is to provide an extremely sensitive pressure reducing valve which will very closely regulate and maintain a desired given pressure on the downstream side of the valve.

Another object of the invention is to provide a pressure reducing valve which will operate at full capacity, and which will not have the flow restricted therethrough due to continuous by-passing of fluid through the diaphragm chamber during open position as occurs in certain conventional valves.

Another object of the invention is to provide an automatic pressure reducing valve having automatic control means responsive to pressure changes in the outlet chamber of the valve.

Still another object of the invention is to provide an automatic pressure reducing valve having control means which will permit rapid opening and closing of the valve so as to prevent the building up of excess pressure on the downstream side of the valve.

A further object of the invention is to provide a pressure reducing valve and an automatic control means arranged and constructed so as to eliminate the usual hunting action often encountered in conventional valves of this type.

A still further object of the invention is to provide automatic control means for a pressure reducing valve which will prevent the setting up of pulsations on the downstream side of the valve and which will provide for smooth modulation during the opening and closing movements of the main valve.

Briefly the invention comprises a pressure reducing valve of the diaphragm type provided with dual pilot control means. That is to say, the pressure reducing valve is controlled by two pilot valves each of which is arranged to be actuated by a pressure responsive mechanism connected with the outlet chamber of the main valve. More specifically, one of the pilot valves is arranged to serve as an inlet valve for controlling the admission of operating fluid under pressure into the main valve, and the other pilot valve is adapted to serve as an outlet valve for controlling the exhaust of spent operating fluid from the main valve. Preferably the inlet pilot valve derives its operating fluid from the inlet chamber of the main valve and the pressure responsive actuating mechanism for the inlet and outlet pilot valves are interconnected for simultaneous actuation and are subjected to the pressure in the outlet chamber of the main valve.

The invention will be further understood from the following description and the accompanying drawings, in which:

Figure 1 is an elevational view of a main pressure reducing valve and dual pilot control means therefor embodying the principles of the present invention.

Figure 2 is a plan view of the valve and control means shown in Figure 1.

Figure 3 is an enlarged sectional view taken on the line 3—3 of Figure 1, illustrating the details of the inlet pilot valve and the pressure responsive actuating means for said pilot valve.

Figure 4 is a sectional view taken on the line 4—4 of Figure 3.

Figure 5 is a fragmentary plan view of the fluid pressure responsive mechanism taken on the line 5—5 of Figure 4.

Figure 6 is an enlarged plan view of the inlet pilot disc and its associated seat.

Figure 7 is a similar view of the outlet pilot disc.

Figure 8 is a diagrammatic view of the main valve showing the position of the inlet and outlet pilot discs when the valve is in its normal wide-open position.

Figure 9 is a view similar to Figure 8 but showing the pilot discs in the position they assume when the main valve is in its fully closed position; and, Figure 10 is a view similar to Figure 8 showing the pilot discs in the position they assume when the main valve is in an intermediate or modulating position.

Referring now to Figures 1 and 2 of the drawings, the main valve is generally indicated by the numeral 1 and includes a body B, cover C, and a circular diaphragm D whose marginal portion is clamped between the body B and the cover C by any suitable number of conventional cap screws (not shown). The body B is provided with a substantially vertical partition wall 3, which cooperates with an inclined wall portion 4 to provide inlet and outlet chambers 5 and 6, respectively, in said body.

The wall portions 3 and 4 are merged to provide a circular opening, which is threaded and adapted to receive an annular valve seat 7. The valve seat 7 is provided with a circular opening 8 through which water or other liquid can pass in traveling from the inlet chamber 5 to the outlet chamber 6. The inlet chamber 5 contains a cylindrical guide portion 11 adapted to receive the lower end 12 of a valve stem 13. Ports 14 extend through the guide portion 11 and connect the interior thereof with the inlet chamber 5, whereby resistance to downward movement of the valve stem 13 by fluid within the guide 11 is precluded.

The cover member C is provided with a central boss portion 16 counterbored to receive a guide bushing 18 for the upper end 19 of the valve stem 13. The bushing 18 is arranged so that it is in axial alignment with the guide 11 and serves as a guide for the upper end of the valve stem 13. The valve stem 13 has a threaded portion 20 intermediate the ends thereof adapted to receive nuts 21 for clamping followers 22 and 23 in position upon opposite sides of the diaphragm D and for retaining an annular sealing ring 24 in position in the follower 23 by means of a clamping member 25.

The boss 16 of the cover member C has a threaded opening adapted to receive one end of a pipe nipple 27 which serves as a housing for the upper end 19 of the valve stem 13. A pipe cap 28 is mounted upon and forms a closure for the opposite end of the pipe nipple 27.

The cover C is provided with a cavity 29 adapted to receive operating fluid under pressure for actuating the diaphragm D. The operating fluid under pressure is admitted into the diaphragm chamber 29 by means of a passageway 31 formed in a boss 32 carried by the cover member C, the lower end of the passageway 31, of course, communicating with the chamber 29. The admission of fluid into the passageway 31 is controlled by a pressure-responsive device generally indicated by the letter "V" and including an inlet pilot valve "W," which will be described in detail hereinafter.

The cover C is also provided with an exhaust passageway 33 formed in a boss 34, the lower end of said passageway communicating with the diaphragm chamber 29. The discharge of spent operating fluid from the diaphragm chamber 29 is controlled by a second pressure-responsive device "X" including an outlet pilot valve "Y."

The main valve 1 is connected in a pipe line 34 so that the inlet chamber 5 is on the upstream side and the outlet chamber 6 is on the downstream side of said main valve. The main valve is adapted to function as a pressure-reducing valve for maintaining a constant pressure on the downstream side of the valve, regardless of the relatively higher pressure, or variations in said higher pressure, on the upstream side of the valve. For example, the valve 1 may be adjusted to maintain a pressure of 50 lbs. per sq. in. on the downstream side while the pressure on the upstream side may be 80 lbs. per sq. in. more or less.

Operating fluid under pressure for effecting closing of the main valve 1 is derived from the inlet chamber 5 of said main valve, although it will be apparent that the operating fluid may be taken from some other suitable source. Thus, a conduit 35 is connected at one end thereof to the body B, as indicated at 36 (Fig. 2), and the opposite end of said conduit is connected as indicated at 37 to the housing 38 of the pilot valve W. The conduit 35 includes a plug valve 39, by means of which flow through the conduit 35 may be cut off when desired, and a conventional strainer 35a for straining the operating fluid before it reaches the inlet pilot valve W. The pilot valve W is mounted upon the boss 32 by means of a short pipe nipple 40 which communicates with the aforedescribed passageway 31.

The pressure-responsive pilot valve actuating devices V and X are inter-connected by a conduit 42 which in turn is connected by a conduit 43 with the outlet chamber 6 of the main valve. A plug valve 44 is arranged in the conduit 43 so as to cut off flow through said conduit when desired. The pilot valve Y associated with the pressure-responsive device X is connected with the boss 34 by piping 45. This piping, as is best shown in Figure 1, communicates with the exhaust passageway 33 in the valve cover C. The pilot valve Y is also connected with a pipe 46 which serves as a drain for conducting fluid from the pilot valve Y back to the outlet chamber 6 of the main valve. The pipe 46 contains a plug valve 47 (Fig. 2), which can be actuated to prevent flow through said pipe when desired.

It will be apparent from the foregoing that the control devices V and X must operate in response to pressure changes in the outlet chamber 6 of the main valve 1. It will also be apparent that operating fluid under pressure for effecting closing of the main valve 1 is supplied to the inlet pilot valve W from the inlet chamber 5 of said main valve through the conduit 35, and that the exhaust of spent operating fluid is controlled by the outlet pilot valve Y, the spent fluid being conducted to the pilot valve Y through the piping 45 and draining from said pilot valve back to the outlet chamber 6 of the main valve through the drain pipe 46. It will be further apparent that the control mechanisms V—W and X—Y can be isolated from the main valve 1 by closing the plug valves 39, 44 and 47.

The inlet pilot valve W and the pressure-responsive mechanism V for actuating said pilot valve is best illustrated in Figures 3–5, inclusive, to which reference is now made. The pilot valve W includes the housing 38, and a base member 50 disposed therebelow with a gasket 52 interposed between said housing and base member. Screws 53 secure the housing 38, base 50 and gasket 52 in an assembled relation. The pipe nipple 40, previously referred to, is threaded into the base member 50 and provides a rigid mounting means for the inlet pilot W and its associated actuating mechanism V.

The pilot valve housing 38 contains a pressure or pilot disc chamber 56 which communicates with the conduit 35 through a passageway 61 (Fig. 4) in the pilot valve housing 38.

The pressure chamber 56 is formed at the lower end of the pilot valve housing 38, the open end of which is closed by a circular plate 63 serving as a seat for a pilot disc 64. The seat 63 may be secured to the housing 38 in any conventional manner and is provided with six ports 65 (see Figs. 3 and 6), all spaced the same radial distance from the center of the seat and disposed upon radii spaced about 60° apart. The gasket 52, of course, is provided with a suitable central opening so as not to obstruct flow through the ports 65.

As will be apparent from Fig. 6, the pilot disc 64 is also provided with six through ports 66 which are angularly and radially spaced in a manner identical with the ports 65 in the pilot seat 63, so that when the ports 66 of the pilot disc are placed in registration with the ports 65 fluid under pressure can flow from the pressure chamber 56 through all six ports. The fluid after passing through the seat 63 enters a chamber 68 in the base member 50 underlying the housing 38. Obviously, the fluid from the chamber 68 readily enters the pipe nipple 40 and flows through the passageway 31 into the diaphragm chamber 29 of the main valve 1.

The pilot disc 64 is further provided with a pair of apertures 70 (Fig. 6) adapted to receive pins 71 (Fig. 3) depending from a drive washer 72. The drive washer 72 is mounted upon one end of a vertical pilot shaft 73. The shaft 73 extends through an opening 74 in the housing 38 and is surrounded by an adjustable packing gland 75, the lower end of which engages a washer 76 to compress a body of packing 77 into sealing engagement with said shaft to prevent the escape of operating fluid from the pressure chamber 56. A compression spring 78 surrounds the shaft 73 and is interposed between the drive washer 72 and the adjacent wall of the chamber 56. The purpose of the spring 78 is to urge the drive washer 72 downwardly to hold the pilot disc 64 against the seat 63 in order to avoid inadvertent movement of the pilot disc away from said seat. The spring 78 ordinarily is not essential inasmuch as the pressure of the operating fluid in the chamber 56 tends to maintain the pilot disc 64 tight against its seat 63. However, in the event of low pressure, or pressure failure, the spring 78 will keep the pilot disc 64 seated so that no foreign matter can get between it and the seat 63.

It is to be noted that in the present construction the pilot disc 64 does not have exhaust ports. All of the ports 66 serve as pressure ports, thereby making it possible to pass a greater volume of operating fluid through a pilot disc of a given size than could be done if provision had to be made for exhaust ports. One advantage of this is that the main valve can be closed at a faster rate than heretofore because of the greatly increased flow of operating fluid to the diaphragm chamber 29.

The inlet pilot valve W is adapted to be actuated in accordance with pressure changes in the outlet chamber 6 of the main valve 1, and this is accomplished through the pressure-responsive mechanism V, which will now be described.

The mechanism V, which effects rotation of the pilot shaft 73 to actuate the pilot disc 64, includes a casing 79 provided with a chamber 80 and a cover plate 81 which forms a closure for said chamber. The cover plate 81 is secured to the casing 79 by screws 82. As is best shown in Figure 4, the casing 79 is mounted on the pilot valve housing 38 by means of screws 84, the heads of which are received in the chamber 80. A sleeve 85 extends through the bottom wall of the casing 79 and is recessed as indicated at 86 to receive the upper end of the pilot shaft 73. A pin 87 serves to connect the sleeve 85 and shaft 73 in relatively non-rotatable relation. The sleeve 85 has an upper extremity 88 which projects through the cover plate 82. The sleeve 85 is further provided with an intermediate portion which is at least partially threaded as indicated at 90. A gear 91 is received upon said intermediate portion and is clamped in non-rotatable relation to the sleeve by a nut 92 cooperating with the threaded portion 90.

The gear 91 need not be toothed throughout its periphery and may be constructed as shown in Figure 5. However, said gear is provided with sufficient teeth to be rotated through an angle of about 30° by a reciprocable rod 93 provided with ridges 94, which convert a portion of said rod into a rack effective to impart turning movement to the gear 91. Turning of the gear 91 necessarily causes rotation of the sleeve 85 and the pilot disc shaft 73.

It will be observed from Fig. 5 that the teeth of the gear 91 are disposed upon radii arranged 30° apart. The object of such spacing is to make it possible to readily offset the pilot discs of the pilot valves W and Y, as will be explained later.

The rod 94 is disposed at right angles to the sleeve 85 and is slidably mounted in openings 85 in the opposite sidewalls of the casing 79, as best shown in Figure 3. One end of the rod 93 is reduced and threaded as indicated at 96 and carries a circular plate 97 which engages one side of a flexible diaphragm 98. The diaphragm 98 is marginally secured between a flange 99 formed integral with the casing 79 and a flange 100 formed upon a cover plate 101, the cover plate 101 and the casing 79 being secured together by a suitable number of screws 102.

The casing 79 is also provided with an internally threaded annular flange 103 adapted to receive one end of a pipe nipple 104. The opposite end of the pipe nipple 104 is received in an internally threaded cap member 105. A helical compression spring 106 is received within the pipe nipple 104 and one end of said spring rests against a washer 107 mounted upon a shouldered end 108 of the rod 93. The opposite end of the spring 106 engages a washer 109 abutting against the extremity of an adjusting bolt 110, threadedly mounted in the cap 105. The bolt 110 is adapted to be adjusted to vary the compression of the spring 106 and can be locked in any desired position of adjustment by a lock nut 111 arranged to be jammed against the cap 105.

The function of the spring 106 is to urge the rod 93 to its left-most position as viewed in Fig. 3 so that the pilot disc 64 will normally be in a position with the ports 66 out of registration with the passageways 65 in the pilot seat 63, when the main valve is in its open position (note Fig. 8). However, when the main valve is in its closed position the ports 66 are in registration with the passageways 65, as shown in Fig. 9.

Shifting of the pilot disc 64 from the position shown in Fig. 8 to that shown in Fig. 9 is effected by the application of pressure fluid to the diaphragm 98 transmitted through the conduits 43 and 42 from the outlet chamber 6 of the main valve 1. To this end, the cover 101 is shaped so as to provide a chamber 112 adapted to receive said fluid under pressure to effect shifting of the rod 93 to the left (Fig. 9) to thereby turn the pilot disc 64 through an angle of 30° to position the same so that the main valve 1 can be closed automatically by operating fluid under pressure from the chamber 56.

The adjustment of the spring 106 determines the pressure that will be maintained on the downstream side of the main valve and exerts a force which must be overcome by pressure in the diaphragm chamber 112 before shifting of the rod 93 can take place. The movement of the rod 93 toward the right is limited by the engagement of the washer 107 (see Fig. 3) with the wall surface 113 of the casing 79 and the movement of said rod toward the left is limited by the engagement of the plate 97 with the wall surface 114. Thus, the stroke of the rod 93 is definitely limited so that the pilot disc 64 is turned to exactly the right angle necessary to position the ports 66 in cooperating relation with the passageways 65 in the seat 63.

The inlet pilot valve Y and the pressure-responsive mechanism X for actuating said pilot valve are identical in construction to the pilot valve W and the mechanism V just described, and hence a description of the mechanism X and pilot valve Y would be mere surplusage. However, the corresponding parts of the actuating mechanism X and the pilot valve Y are distinguished in the drawings from the mechanism V and pilot valve W by the addition of the character prime (′) thereto.

It will be apparent from Figs. 8, 9, and 10 that the pressure chambers 112 and 112′ of the pressure responsive devices W and X, respectively, are inter-connected by the conduit 42, which in turn is connected by the conduit 43 with the outlet chamber 6 (not indicated in these figures) of the main valve. Thus, the pressure in the outlet chamber 6 is simultaneously communicated to the chambers 112 and 112′ so that simultaneous actuation of the pilot valves W and Y can take place.

While the mechanisms V and X and their associated pilot valves W and Y, respectively, are structurally the same, it is to be understood that the pilot discs 64 and 64′ are relatively offset 30° with respect to each other so that when one pilot disc is positioned for full flow through the ports thereof, the other pilot disc will be positioned so that the ports are out of registration with the passageways in the associated seat. Offsetting of the pilot discs 64 and 64′ is readily accomplished by shifting the gear 91 one tooth relative to the rack teeth 94. Inasmuch as the gear teeth are angularly spaced 30° and the ports 66 and 66′ are spaced 60°, as previously pointed out, the two pilot discs 64 and 64′ are thus positioned out of phase. In view of the fact that the angle of movement of the pilot discs is 30°, one pilot valve opens while the other closes. The relative offsetting of the pilot discs 64 and 64′ will be apparent from a comparison of the positions in which they have been shown in Figs. 6 and 7.

With this arrangement the inlet pilot valve W is adapted to be opened and cause closing of the main valve 1 when the pressure in the outlet chamber 6 exceeds the force of the spring 106 opposing movement of the rod 93, and to close and shut off operating fluid upon a drop in pressure in said outlet chamber enabling the spring 106 to return the rod 93 to its initial position to effect closing of the main valve. The operation of the outlet pilot Y, while it occurs simultaneously, is exactly the opposite. In other words, the outlet pilot disc 64′ is so arranged relative to its seat 63′ as to obstruct the flow of exhaust fluid from the chamber 56′ when the pressure is high in the outlet chamber 6. On the other hand, when the pressure in the outlet chamber 6 is reduced by consumer demands on the line, etc., or in any event is less than the force of the spring 106′ tending to move the rod 93′ to the left, the pilot 64′ will take the position shown in Fig. 8 permitting the escape of fluid from the main diaphragm chamber 29, to thereby allow opening of the main valve 1.

While the six ports 66 of the inlet pilot disc 64 have been pointed out as providing for a very rapid introduction of operating fluid under pressure into the diaphragm chamber 29 of the main valve 1 to quickly close said valve, the ports 66′ of the outlet pilot disc 64′ serve equally well to permit rapid exhaust of operating fluid from said diaphragm valve to permit unusually quick opening of said main valve. Moreover, since no fluid flows through the chamber 29 when the pilot valve W is closed, said chamber can be substantially completely emptied and the main valve thus permitted to open to its fullest possible extent to allow maximum flow therethrough.

Figure 8 illustrates the position of the ports in the pilot discs of the respective pilot valves W and Y during normal operation of the main valve 1, while said valve is open. It will be noted that at this time the pilot disc 64 is obstructing the flow of pressure fluid from the chamber 63 to diaphragm chamber 29 of the main valve 1, and that the pilot disc 64′ is so positioned as to permit spent operating fluid to pass from said chamber through passageway 33 and piping 45 into the chamber 56′, through pilot ports 66′ and passages 65′ into the drain pipe 46. It will be noted that the rods 93 and 93′ have been respectively shifted to the right and left under the influence of their associated springs 106 and 106′ because of the reduced pressure on the diaphragms 98 and 98′. It will be understood that the springs 106 and 106′ need not be adjusted to offer the same resistance to compression and that actually in practice it is desirable in some instances to adjust the springs individually to meet the operating requirements on a particular installation.

For example, in the event that periodic pulsations tend to occur, the spring tension of one pilot valve may be adjusted so that the disc thereof will be delayed in action, or slightly out of phase with the other pilot disc and thus break up any synchronization or harmonic vibrations that may tend to form. In this manner, the outlet pilot valve Y could be delayed in its closing action until after the inlet pilot W assumed a position to effect closing of the main valve 1, or vice versa, as circumstances may require.

Figure 9 illustrates the relative position of the pilot discs 64 and 64′ when the main valve 1 is in its closed position. The pilot disc 64 is now positioned with its ports 66 in registration with the passages 65 in the seat 63 so that operating fluid is admitted into the diaphragm chamber 69; whereas, the outlet pilot disc 64′ has its ports out of registration with the passages 65′ preventing the escape of said fluid from said chamber.

In view of the fact that separate inlet and outlet pilot valves W and Y are provided by the present invention, it is possible to adjust each pilot valve independently of the other, if necessary, to provide the further advantage of eliminating the hunting action which commonly occurs in many present day pressure reducing valves and which is highly objectionable.

Instead of the usual hunting action, the present pilot valves provide for a smooth modulation regardless of the variation in pressures on either the upstream or downstream side of the main valve. Figure 10 diagrammatically illustrates the manner in which modulation occurs by showing the ports 65 and 65′ in only slightly overlapping relation with their associated passageways 66 and 66′ enabling a very slight flow or leakage of liquid through the diaphragm chamber 29 while the valve is "settling" itself in accordance with the pressure condition prevailing on the downstream side of the main valve.

The present dual pilot control also enables more sensitive operation of the main valve because of the small angle through which the pilot disc turns to open and close said pilot valves. This enables a closer, more accurate control of the pressure on the downstream side of the valve, which is highly desirable because it avoids damage to equipment otherwise caused by repeated stresses due to fluctuation in pressure.

While the main valve has been described in connection with water, it will be understood that the valve is equally capable of handling gas.

It will be understood that various changes may be made in the construction of the valve and control means shown herein without departing from the spirit of the invention or the scope of the attached claims.

I claim:

1. A fluid pressure operable main valve having a body provided with inlet and outlet chambers, a cover and a diaphragm between the body and the cover for controlling the flow between said chambers, said cover and diaphragm being arranged to provide a diaphragm pressure chamber between the inner surface of said cover and the adjacent side of said diaphragm, the opposite side of said diaphragm being subject to the pressure of the fluid in said outlet chamber; an inlet pilot valve, said inlet pilot valve including a pressure chamber adapted to receive operating fluid under pressure for effecting closing of said main valve; a conduit establishing communication between said inlet chamber of said main valve and said pressure chamber of said inlet pilot valve; a first conduit means arranged to serve the dual purpose of mounting said inlet pilot valve upon said cover and conducting operating fluid under pressure from the pressure chamber of said inlet pilot valve to the diaphragm first pressure chamber of said main valve; a pressure responsive device including a housing having a pilot diaphragm and a pressure chamber for operating fluid on one side of said pilot diaphragm, a rotatable pilot disc for controlling the flow of operating fluid from the pressure chamber of said inlet pilot valve to the diaphragm pressure chamber of said main valve to effect closing of said main valve, and means actuable by said pilot diaphragm for effecting rotation of said pilot disc in accordance with pressure variations in said pilot diaphragm chamber; an outlet pilot valve including a chamber adapted to receive spent operating fluid from the diaphragm pressure chamber of said main valve; a second conduit serving the dual purpose of mounting said outlet pilot valve upon said cover and establishing communication between said diaphragm pressure chamber of said main valve and said spent fluid chamber of said outlet pilot valve; a second conduit means for conducting spent operating fluid from said spent operating fluid chamber of said outlet pilot valve to said outlet chamber of said main valve; a second pressure responsive device including a housing having a pilot diaphragm and a pressure chamber for operating fluid on one side of said diaphragm, a rotatable pilot disc for controlling the flow of spent operating fluid from said spent operating fluid chamber of said outlet pilot valve to the outlet chamber of said main valve to allow opening of said main valve, and means actuable by said pilot diaphragm for effecting rotation of said pilot disc in accordance with pressure variations in said pilot diaphragm pressure chamber; and conduit means arranged to connect the pilot diaphragm pressure chambers of said two pressure-responsive devices with the outlet chamber of said main valve, whereby to effect simultaneous rotation of said pilot discs in response to pressure changes in said outlet chamber of said main valve.

2. A fluid pressure operable main valve as defined in claim 1, in which the pressure responsive devices include independently adjustable means yieldably opposing flexing of the pilot diaphragms in one direction to vary the pressures at which they will actuate their associated rotatable pilot discs.

DONALD G. GRISWOLD.